United States Patent
Cowan et al.

(10) Patent No.: US 11,718,231 B2
(45) Date of Patent: Aug. 8, 2023

(54) ASSEMBLY FOR ATTACHING A REAR VIEW MIRROR TO A VEHICLE

(71) Applicant: Clearview Property Management Pty Ltd, Craigieburn (AU)

(72) Inventors: Michael Cowan, Craigieburn (AU); Paul McCormack, Craigieburn (AU)

(73) Assignee: CLEARVIEW PROPERTY MANAGEMENT PTY LTD, Craigieburn (AU)

( * ) Notice: Subject to any disclaimer, the term of this patent is extended or adjusted under 35 U.S.C. 154(b) by 81 days.

(21) Appl. No.: 17/331,394

(22) Filed: May 26, 2021

(65) Prior Publication Data
US 2021/0370833 A1 Dec. 2, 2021

(30) Foreign Application Priority Data
May 27, 2020 (AU) ................ 2020901741

(51) Int. Cl.
*B60R 1/06* (2006.01)

(52) U.S. Cl.
CPC ..................... *B60R 1/06* (2013.01)

(58) Field of Classification Search
CPC .. B60R 1/02; B60R 1/06; B60R 1/062; B60R 1/07; B60R 1/074; B60R 1/078; B60R 1/12; B60R 1/1207; B60R 2001/1253
USPC .... 248/475.1, 476, 480, 466, 479, 485, 486; 359/841, 877, 872, 873, 881, 876
See application file for complete search history.

(56) References Cited

U.S. PATENT DOCUMENTS

| | | | | |
|---|---|---|---|---|
| 4,558,930 A | * | 12/1985 | Deedreek ............. | G02B 7/1827 359/881 |
| 5,483,385 A | * | 1/1996 | Boddy .................... | B60R 1/078 359/872 |
| 6,179,428 B1 | * | 1/2001 | Krass ..................... | B60R 1/078 248/478 |
| 6,239,928 B1 | | 5/2001 | Whitehead et al. | |
| 6,394,616 B1 | * | 5/2002 | Foote ..................... | B60R 1/074 359/881 |
| 6,505,943 B1 | * | 1/2003 | Olijnyk .................. | B60R 1/078 359/881 |
| 6,726,337 B2 | * | 4/2004 | Whitehead ............. | B60R 1/078 248/478 |

(Continued)

FOREIGN PATENT DOCUMENTS

DE 10210863 A1 9/2003
EP 1086855 A2 3/2001

*Primary Examiner* — Christopher Garft
*Assistant Examiner* — Michael McDuffie
(74) *Attorney, Agent, or Firm* — Muncy, Geissler, Olds & Lowe, P C.

(57) ABSTRACT

Disclosed herein is an assembly for attaching a rear view mirror to a vehicle. The assembly comprises an intermediate member configured to slide with respect to an arm that extends outwardly from a mirror base, a proximal end of the intermediate member being configured to interlock with the arm such that the arm and intermediate member become rigidly joined. The assembly also comprises a mirror head support configured to slide with respect to the intermediate member, the mirror head support being configured to interlock with the intermediate member such that the mirror head support and intermediate member become rigidly joined. Also disclosed is an extendable rear view mirror assembly.

19 Claims, 8 Drawing Sheets

(56) References Cited

U.S. PATENT DOCUMENTS

| | | | |
|---|---|---|---|
| 7,163,300 B2 * | 1/2007 | Olijnyk | B60R 1/076 359/877 |
| 7,165,853 B2 * | 1/2007 | Gilbert | B60R 1/1207 359/881 |
| 7,261,427 B1 | 8/2007 | Ruse et al. | |
| 7,267,449 B1 * | 9/2007 | Boddy | B60R 1/078 359/877 |
| 7,287,867 B2 * | 10/2007 | Wellington | B60R 1/07 359/865 |
| 7,293,887 B2 * | 11/2007 | Foote | B60R 1/078 359/873 |
| 7,441,911 B2 * | 10/2008 | Ruse | B60R 1/0605 248/478 |
| 7,594,731 B2 * | 9/2009 | Sinelli | B60R 1/025 359/872 |
| 7,748,857 B2 * | 7/2010 | Fimeri | B60R 1/078 248/479 |
| 9,057,833 B2 * | 6/2015 | Bowers | G02B 7/182 |
| 9,150,156 B2 * | 10/2015 | Bowers | B60R 1/0607 |
| 9,862,321 B2 * | 1/2018 | Henion | H04N 5/2252 |
| 10,576,895 B2 * | 3/2020 | Cowan | B60R 1/006 |
| 11,077,799 B2 * | 8/2021 | Sinelli | B60R 1/078 |
| 2007/0109674 A1 | 5/2007 | Hastie | |
| 2008/0179485 A1 | 7/2008 | Yang | |
| 2021/0291741 A1 * | 9/2021 | Wilson | B60R 1/078 |

* cited by examiner

ASSEMBLY FOR ATTACHING A REAR VIEW MIRROR TO A VEHICLE

TECHNICAL FIELD

The present invention relates to an assembly for attaching a rear view mirror to a vehicle. The assembly enables the rear view mirror to be moved between retracted and extended positions.

BACKGROUND ART

There are many occasions when it would be advantageous to extend the rear view mirrors on the driver and passenger sides of a vehicle further away from the sides of the vehicle. For example, when towing wide items such as caravans, even a short outward extension of a rear view mirror may enable the driver to see around the caravan and hence see whether any other vehicles are traveling behind them.

Extendable rear view mirrors are known. However, such mirrors often have a limited range of extension due to the physical constraints of the mirrors' retracted configuration. Extendable rear view mirrors can also suffer from vibrational issues, which tend to increase with increasing distance away from the vehicle. Vibrating rear view mirrors are difficult for a driver to use effectively, and frequently suffer from mechanical issues.

It would be advantageous to provide an assembly for attaching a rear view mirror to a vehicle, where the assembly enables the mirror to be extended and retracted but without an increase in vibration which might hinder use of the mirror.

SUMMARY OF INVENTION

In a first aspect, the present invention provides an assembly for attaching a rear view mirror to a vehicle. The assembly comprises an intermediate member configured to slide with respect to an arm that extends outwardly from a mirror base, a proximal end of the intermediate member being configured to interlock with the arm such that the arm and intermediate member become rigidly joined. The assembly also comprises a mirror head support configured to slide with respect to the intermediate member, the mirror head support being configured to interlock with the intermediate member such that the mirror head support and intermediate member become rigidly joined.

Advantageously, the unique structure of the assembly of the present invention provides rigid joins between the extending parts of the assembly, which substantially eliminates any degree of play between those parts and hence consequential vibration of the mirror head. Indeed, in embodiments of the invention (described below) the inventors have found that an extension of up to 180 mm is possible, which is 80 mm greater than that achievable by extendable rear view mirrors of which the inventors are aware, without significant vibration issues.

In some embodiments, the arm, intermediate member and mirror head support may define concentric tubular parts that slide telescopically with respect to each other. As would be appreciated, such a telescopic configuration maximises the overlap and surface contact between the parts, which helps to reduce any play therebetween. The mirror head support may, for example, comprise a tubular recess into which the intermediate member is slidably receivable. Such a recess both snugly receives the intermediate member and provides a housing for the intermediate member (and arm) when the mirror is in its retracted position.

In some embodiments, the intermediate member may comprise longitudinal ribs that extend along at least a portion of its bore such that a surface contact area between an outside of the arm and the bore of the intermediate member is reduced. Thus, only the longitudinal ribs abut the arm when it is located inside the intermediate member's bore, making it easier for the intermediate member to slide with respect to the arm, and especially so if dirt or water has entered the assembly (which is always a risk with vehicles), but whilst still providing firm contact across the full length of the parts' overlap in order to reduce vibration.

In some embodiments, the intermediate member may comprise one or more longitudinal ribs that extend along an outer surface thereof. The or each longitudinal rib may be located in a corresponding groove in the mirror head support in use, such that rotation of the intermediate member with respect to the mirror head support is precluded. As would be appreciated, eliminating any relative rotational movement between parts of the assembly would even further reduce vibration.

In some embodiments, the proximal end of the intermediate member (i.e. the end closest to the vehicle, in use) may comprise snap hooks configured to interlock with lateral grooves (e.g. annular grooves when the parts are telescopically configured) spaced along the arm. The lateral grooves on the arm may be positioned such that they corresponded to defined positions of a mirror head supported by the mirror head support (e.g. corresponding to a retracted and extended position of the mirror head). As would be appreciated, the join effected between a snap hook and a groove, in combination with the other interactions between the arm and intermediate member described herein, would effectively fix the two parts together, almost as if they were a single part.

In some embodiments, the snap hooks may be provided on crenulations projecting from the proximal end of the intermediate member. Such crenulations may have a degree of play, which enables them to even more securely locate the snap hooks within the lateral groove. In some embodiments, a torsional spring configured to clamp the proximal end of the intermediate member onto the arm may also be provided. As would be appreciated, positioning the torsional spring over the crenulations would urge the snap fittings into the groove, yet again strengthening the join therebetween.

In some embodiments, an outer surface of the intermediate member may comprise grooves spaced therealong. In such embodiments, the mirror head support may comprise snap hooks configured to interlock with the lateral grooves on the outer surface of the intermediate member. Similar to that discussed above, the snap hooks may be provided on crenulations projecting from the mirror head support, with one or more torsional springs configured to clamp the mirror head support onto the intermediate member optionally being provided as well.

In some embodiments, the positions of the lateral grooves on the outer surface of the intermediate member may correspond to defined positions (e.g. to a retracted and extended position) of a mirror head supported by the mirror head support.

In a second aspect, the present invention provides an extendable rear view mirror assembly comprising a mirror base configured for attachment to a vehicle (typically the side of the vehicle), one or more arms that extend outwardly from the mirror base, one or more intermediate members and a mirror head comprising a mirror head support. Each intermediate member is configured to slide with respect to a respective arm, with its proximal end being configured to interlock with the arm whereby the arm and intermediate member become rigidly joined. The mirror head support is configured to slidably receive the one or more intermediate members and is configured to interlock with the or each intermediate member such that the mirror head support and intermediate member(s) become rigidly joined.

The intermediate member(s) and mirror head support of the assembly of the second aspect of the present invention may, for example, be as described herein in relation to the assembly of the first aspect of the present invention.

In some embodiments, the assembly of the second aspect may comprise two intermediate members configured to slide with respect to and interlock with two arms that extend outwardly from the mirror base. In such embodiments, the mirror head support may be configured to slidably receive and interlock with both intermediate members.

In some embodiments, the arms may be parallel and joined by a cross member that is rotatably mounted to the mirror base and whereby rotation of the cross member causes the mirror head to move between an infolded position and a deployed position. Such an assembly may, for example, take the form described in Australian patent application no. 2018205152, with the attendant benefits.

In some embodiments, the assembly may also comprise a driver that is operable to move the mirror head between the infolded and deployed positions. The driver may advantageously be electrically actuated, for example by the driver pushing a button.

In some embodiments, the assembly may also comprise a collapsible cover extending between the mirror base and the mirror head. Such a cover covers the one or more arms and intermediate members and may provide both aesthetic and protective functionality.

In a third aspect, the present invention provides a kit of parts which, when assembled, provide the assembly of the first or second aspect of the present invention.

Additional features and advantages of the various aspects of the present invention will be described below in the context of specific embodiments. It is to be appreciated, however, that such additional features may have a more general applicability in the present invention than that described in the context of these specific embodiments.

BRIEF DESCRIPTION OF DRAWINGS

Embodiments of the present invention will be described in further detail below with reference to the following drawings, in which.

DESCRIPTION OF EMBODIMENTS

As noted above, in its first aspect the present invention relates to an assembly for attaching a rear view mirror to a vehicle. The assembly comprises an intermediate member that is configured to slide with respect to an arm that extends outwardly from a mirror base. A proximal end of the intermediate member is configured to interlock with the arm such that the arm and intermediate member become rigidly joined. The assembly also comprises a mirror head support configured to slide with respect to the intermediate member. The mirror head support is configured to interlock with the intermediate member such that the mirror head support and intermediate member become rigidly joined.

In its second aspect, the present invention relates to an extendable rear view mirror assembly comprising a mirror base configured for attachment to a side of a vehicle, one or more arms that extend outwardly from the mirror base, one or more intermediate members and a mirror head comprising a mirror head support. Each intermediate member is configured to slide with respect to a respective arm, with its proximal end being configured to interlock with the arm whereby the arm and intermediate member become rigidly joined. The mirror head support is configured to slidably receive the one or more intermediate members and is configured to interlock with the or each intermediate member, whereby the mirror head support and intermediate member(s) become rigidly joined.

As many of the components of the assembly of the first aspect of the invention may also be used in the assembly of the second aspect, these aspects will be generally described together in further detail below. Indeed, as will be appreciated, the assembly of the first aspect is essentially incorporated into the rear view mirror of the second aspect.

The assembly of the present invention may be used with any vehicle and with any configuration of rear view mirror. The assembly has been developed primarily for use with side mounted exterior rear vision mirrors for vehicles (and particularly rear view towing mirrors which have to project further out from the side of a vehicle than conventional mirrors in order for a driver to be able to see what is behind the caravan (etc.) being towed by the vehicle), and will be described in further detail in this context below. It is to be appreciated, however, that assemblies including rigidly joined members may have applications in addition to this, and that the invention is therefore not to be construed as being limited to only use with rear view mirrors.

The assembly may include a mirror base that is configured for mounting to a vehicle in the typical location at the side of the vehicle. The mirror base will need to be specific to a given vehicle, and even to specific models of the same vehicle, in order to be fixable to the vehicle. Mirror bases in accordance with the invention will therefore share a number of common components, but will also need to be adapted (e.g. its shape, the nature of the electrical wiring required, etc.) for use with specific vehicles.

The arm or arms in the assemblies of the present invention extend outwardly from the mirror base. The arm(s) may be joined to the mirror base in any configuration suitable for the uses contemplated by the invention, and may be adapted to move in any suitable relative manner. Typical movements of rear view mirrors on vehicles include folding the mirrors towards the body of the vehicle in order to provide a narrower profile, which may be necessary in tight spaces such as car parks or garages for example. Furthermore, rear view mirrors need to be able to independently move in the event of the mirror head being impacted by another vehicle or object. In some embodiments therefore, the arms may be substantially parallel and joined by a cross member that is rotatably mounted to the mirror base, where rotation of the cross member causes the mirror head to move between an infolded position and a deployed position.

A driver (e.g. an electric motor) operable to rotate the arm members with respect to the mirror base (and hence the vehicle) may be provided. Such a motor would enable the folding function described above to be automatically actuated, which is a highly desirable feature for rear view mirrors and especially when the rear view mirrors are towing mirrors which, of necessity, must project further outwardly from the vehicle than typical rear view mirrors.

A driver operable to move the mirror head between retracted, partially extended and fully extended positions (as will be described in further detail below) may also be provided in the mirror base. Alternatively, such a driver could also be provided in the mirror head support or mirror head.

The components of the assemblies of the present invention may have any respective configurations that allow them to achieve the functionality described herein, namely the extension and retraction in the substantial absence of excessive vibration. Typically, the arm (or arms), the intermediate member (or intermediate members) and the mirror head support define concentric tubular parts that slide telescopically with respect to each other. As would be appreciated, telescopically connected parts are inherently less susceptible to vibration, and especially when the party are snugly fit to each other.

Typically, the arm and intermediate member are cylindrically shaped, with the intermediate member acting as a sleeve on the arm. Typically, the mirror head support comprises a tubular recess into which the intermediate member is slidably receivable. The parts thus define concentric tubular parts that slide telescopically with respect to each other as the mirror is extended and retracted. As will be appreciated, other shapes may be used to similar effect. For example, the respective components may have an elliptical, triangular or square shape in cross section.

The rear view mirror assembly of the present invention includes an arm or arms that extend outwardly from the mirror base. When used with towing mirrors, the assembly would typically include two (or more) arms because towing mirrors tend to be relatively large and therefore require support at multiple points. In some embodiments, however (e.g. where the mirror is relatively small) a single arm may be more effective. Similarly, if a mirror is particularly large, three or more arms may be required for adequate support.

In embodiments including two or more arms, the arms may be parallel or may converge or diverge, and may be joined (typically at or proximal to an end) by a cross member that is rotatably mounted to the mirror base. In such configurations, rotation of the cross member with respect to the mirror base can cause the mirror head to move between its infolded and deployed positions.

The arm members may take any suitable form and may be the same or different. The arm members may have any length and diameter (or other non-circular cross sectional dimension) appropriate for the application in which the assembly is to be used. The arm members may be solid or hollow and have any suitable (e.g. circular or square) cross-sectional profile.

In many types of rear view mirrors for vehicles, two substantially parallel arm members are required in order to support the side view mirror in position at the side of the vehicle. The arms are joined at or close to one end by a joining member, which is the part that is typically received at the mirror base. In embodiments where the mirror base can be disassembled in order to receive the arms/joining member, the arms and joining member may be provided as a single part (e.g. with the arms and joining member being welded together). In order to assemble some folding rear view mirrors (particularly those that are electronically actuated), however, the arm members may need to be provided as separate components which are joined via a perpendicularly orientated (i.e. with respect to the arms) joining member that is passed through a channel within the mirror base (which cannot be disassembled). The folding action of the mirror can then be caused by an electric motor rotating the joining member (and hence the parallel arms, etc.) within the base.

In many existing folding rear view mirrors, an arm assembly is provided including two arm members, where one of the arms includes a perpendicularly extending rod and the other a recess configured to receive the distal end of the rod. However, the arms of such an assembly, even when the rod has a reasonably snug fit within the other arm's recess, have some degree of play. This play (even if only slight) enables relative movement and twisting of one arm with respect to the other and hence vibration of the rear view mirror. This vibration is more severe in the case of rear view towing mirrors, which tend to be larger and extend further away from the vehicle's sides than conventional rear view mirrors.

In some embodiments, therefore, the arm members may be joined in the manner described in the applicant's co-pending patent application, Australian patent application no. 2018205152, the content of which is incorporated herein in its entirety. In that arm assembly, interlocking profiles on the sleeves that extend perpendicularly from ends of the arms securely join the arms, thereby providing what is effectively a one piece joining member. When so-joined, twisting of the arms with respect to each other is much less likely to occur and, in specific embodiments, is simply not possible. Such a configuration can advantageously substantially eliminate relative movement of the joined arm members with respect to each other, which movement might otherwise affect the utility of the assembly (e.g. when used in a rear view mirror, as described herein).

The arm members may be configured to receive an item thereat. The arms may, for example, be provided with means for physically joining such item(s) to the arms (e.g. holes for receipt of screws, inbuilt fasteners or grooves for circlip retainers), or means for frictionally holding the item thereon (e.g. a textured surface upon which a clamp may be clamped onto). In some embodiments, for example, the arm may include one or more grooves or ribs thereon. The grooves or ribs may, for example, be positioned such that they corresponded to defined positions (e.g. retracted and extended positions) of a mirror head supported by the mirror head support.

The grooves or ribs may be laterally arranged, given a longitudinal sliding relationship between the arms and the intermediate member. In embodiments where the parts are telescopically arranged, for example, annular grooves (or ribs) may be provided on the arms. The grooves or ribs may be positioned on the arm such that they correspond with defined positions of the mirror heard (e.g. retracted and extended positions). Physical manipulation of the mirror in the manner described below results in the mirror moving between these positions, possibly with an audible or tactile indication that the position has been achieved.

Typically, the arm members would be formed from a robust and rigid material, such as a metallic material (e.g. a steel tube). However, the overall weight of the assembly needs to be carefully managed and other, suitably strong non-metallic materials might be suitable.

The assembly also includes an intermediate member. The intermediate member is configured to slide with respect to the arm and has a proximal end that can interlock with the arm such that the arm and intermediate member become rigidly joined. The intermediate member is also configured to slide with respect to the mirror head support, with the mirror head support being configured to interlock with the intermediate member such that they become rigidly joined.

The rigid joins between the intermediate member and the arm and the intermediate member and the mirror head support result in the assembly of the present invention having a degree of rigidity not previously achievable. Whilst such rigidity may not be important for many applications of extendable arms, the inventors have recognized that it is extremely important in the context of extendable rear view mirrors, and especially when such are towing mirrors and hence generally relatively large. As noted above, the unique structure of the assembly of the present invention provides rigid joins between the extending parts of the assembly, which substantially eliminates any degree of play between those parts and hence substantially eliminates vibration of the mirror head distal to the vehicle in the assembly.

Any mechanism that enables such rigid joins to be achieved and which is not otherwise incompatible with the assembly may be used. In some embodiments, the proximal end of the intermediate member may, for example, comprise snap hooks configured to interlock with lateral grooves (e.g. as described above) that are spaced along the arm. The physical interaction between these snap hooks and the lateral grooves would tend to very securely retain the intermediate member to the arm. As noted above, any reduction in the ability of the intermediate member and arm to move with respect to each other beneficially reduces vibration through the assembly. The snap hooks may take any conventional form and specific examples of such are described in further detail below.

In some embodiments, the snap hooks may be provided on crenulations projecting from the proximal end of the intermediate member. Such crenulations allow the end of the intermediate member to be deformed inwardly and outwardly, thus enabling a greater clamping ability of the proximal end of the intermediate member onto the arm, and hence an even more positive connection.

In some embodiments, a torsional spring may be provided, which clamps the proximal end of the intermediate member onto the arm, even further reinforcing the rigidity of the join between the components.

The portion of the intermediate member that slides with respect to the arm may take any suitable form. A smooth surface may, for example be presented by the intermediate member to the arm, in order to minimize friction therebetween and allow for smooth extension and retraction of the mirror head. In some embodiments, however, and especially those where the intermediate member is in the form of a tube or a sleeve that telescopically slides on the arm, it may be advantageous to reduce the amount of surface contact between the arm and intermediate member (but not at the expense of any loss of rigidity therebetween). This may be necessary, for example, where there is a risk of dirt or moisture entering the assembly, as would be expected to occur during use of rear view mirrors for vehicles, because such dirt (etc.) could increase the friction between the arm and intermediate member, making them "stick", to the detriment of the mirror's operation. In some embodiments, therefore, the intermediate member may include longitudinal ribs that extend along at least a portion of its bore, whereby a surface contact area between an outside of the arm and the bore of the intermediate member is reduced.

The intermediate portion and/or arm may also include features to limit the range of movement therebetween, and especially to prevent the arm from disengaging from the intermediate member. A specific example of such features will be described below.

The portion of the intermediate member that interacts with the mirror head support may also be configured to provide advantageous functionality. For example, the surface of the intermediate member that slides with respect to the mirror head support (e.g. the outer surface of a cylindrical or otherwise tubular intermediate member) may include grooves (e.g. lateral grooves) spaced therealong. Such grooves may be similar in form and purpose to those provided on the arm and described above, in that the position of the grooves corresponds to defined positions (e.g. retracted and extended positions) of a mirror head supported by the mirror head support.

The intermediate member may also include one or more longitudinal ribs that extend along an outer surface thereof. These longitudinal ribs can be located in a corresponding one or more grooves in the mirror head support, where they would preclude relative rotation between the intermediate member and the mirror head support, hence preventing another potential source of vibration.

As noted above, the assembly typically includes two arms and would therefore also typically include two intermediate members, each of which is configured to slide with respect to and interlock with a respective arm.

The intermediate member may be made of any suitable material, bearing in mind its functional requirements described herein. Typically, the intermediate member will be formed of (or include) material that has a degree of resiliency, which enables the clamping actions described above, which can slide with respect to the other components and which has a strength commensurate with its intended uses. Suitably robust and resilient plastic materials include, for example, polyacrylamide (PA) and polyoxymethylene (POM).

The assembly also comprises a mirror head support configured to slide with respect to the intermediate member and configured to interlock with the intermediate member such that the mirror head support and intermediate member become rigidly joined.

The mirror head support may have any configuration that enables it to slide with respect to the intermediate member. Typically, the mirror head support will include a recess having a shape that is complimentary to that of the intermediate member, such that the intermediate member is snugly slidably received in the recess, where relative movement (i.e. in a non-axial direction) therebetween is substantially precluded. In embodiments where the parts define a telescopic arrangement, for example, the mirror head support may include a tubular recess having the same diameter as the outside of the intermediate member.

Similar to the interlocking mechanism described above between the intermediate member and the arm, the interlock between the mirror head support and intermediate member many be achieved using any suitable mechanism. The mirror head support may, for example comprise snap hooks configured to interlock with the lateral grooves on the outer surface of the intermediate member described above.

The snap hooks may, for example and in embodiments where the parts are telescopically arranged, be provided on crenulations projecting from the mirror head support. Further, in some embodiments, a torsional spring (or springs) configured to clamp the mirror head support onto the intermediate member may also be provided to even further strengthen the join therebetween.

The mirror head support may be provided integrally formed with a mirror head, as this would eliminate another possible join between parts of the assembly, noting that every additional join increases the risk of relative movement and hence vibration of the mirror in use. However, the inventors have found that vibration is not significantly increased if the mirror head is screwed tightly onto the mirror head support. Providing these parts as two separate components can be advantageous, for example enabling an easier molding process.

In embodiments where the assembly includes two arms and two intermediate members, the mirror head support would typically be configured to slidably receive and interlock with both intermediate members. In some embodiments, however, the assembly may include two distinct mirror head supports, where this might provide some advantage.

In some embodiments, the assembly may also comprise a collapsible cover extending between the mirror base and the mirror head. Such a cover covers the one or more arms and intermediate members and may provide both aesthetic and protective functionality.

The collapsible cover may take any suitable form and, in some embodiments, may include a plurality of overlapping sleeves that are configured to telescopically collapse and expand. Covers having an elliptical cross section (described in further detail below) have been found by the inventors to provide good stability and collapsibility. However, any other shape and configuration may be used, provided that it meets the requirements described herein.

Figure 1:
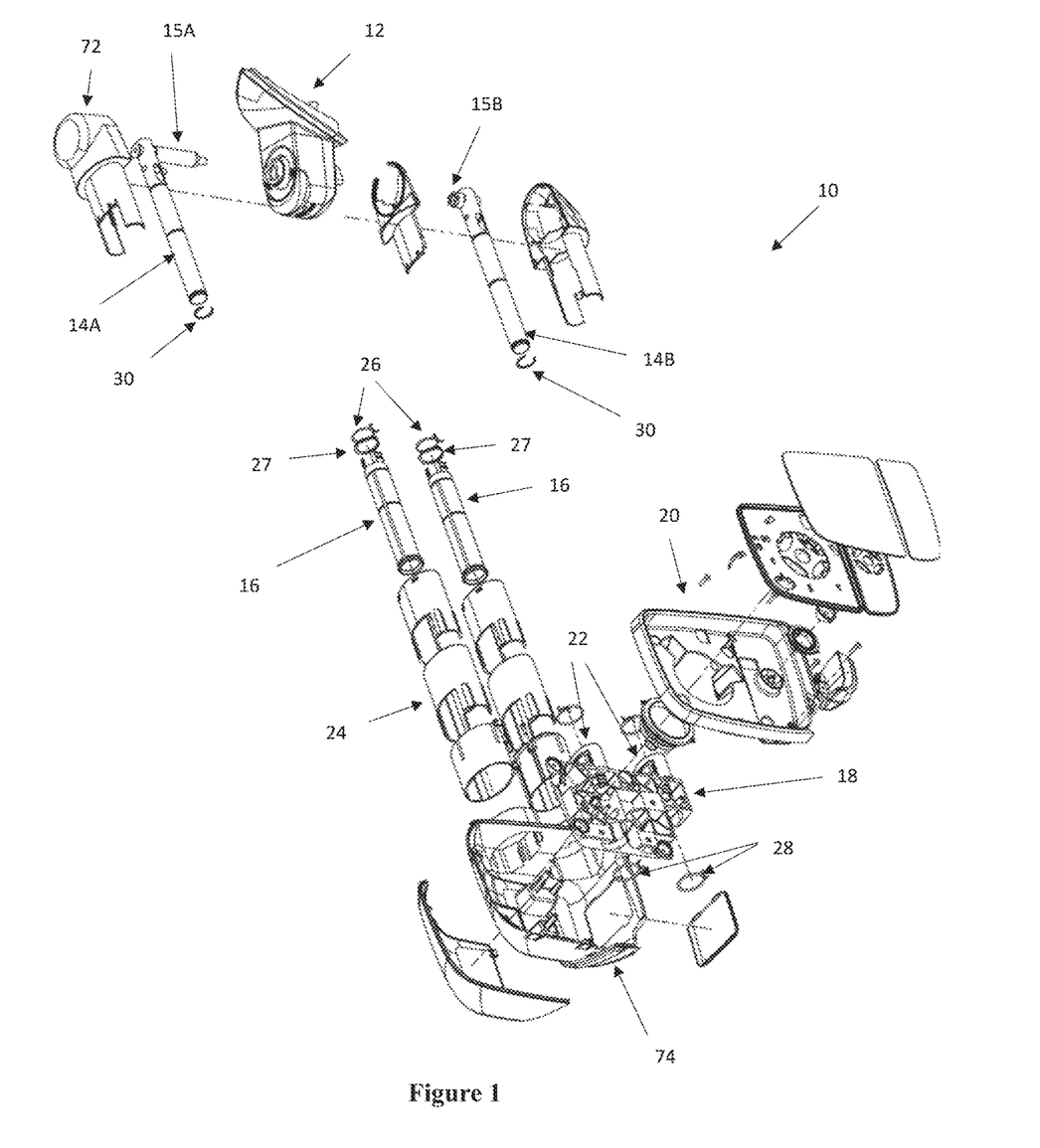
FIG. 1 shows an exploded view of an extendable rear view mirror assembly in accordance with an embodiment of the present invention.

A specific embodiment of the present invention will be described below with reference to the accompanying Figures. Referring firstly to FIG. 1, the components of an extendable rear view mirror assembly 10 are shown in an exploded form to provide an overview of the assembly. Moving in a direction away from the vehicle (not shown) to which the mirror assembly would be mounted, shown is a mirror base 12 having a portion that is configured to be attached to a specific vehicle in a conventional manner.

Arms that extend outwardly from the mirror base 12 are shown in the form of parallel arms 14A, 14B, which are joined together within the mirror base using a two part sleeve 15A, 15B in the manner described in Australian patent application no. 2018205152. Two intermediate members in the form of second stage tubes 16, 16 are also provided, each of which has an internal diameter that is sized to slidably receive a respective arm 14 therein in a snug manner so that non-axial movement is effectively precluded. The assembly 10 also includes a mirror head support bracket 18 housed inside mirror head assembly 20. Support bracket 18 includes arm guides and alignment bosses 22, 22, each of which is sized to slidably receive a respective tube 16 therein in a snug manner so that non-axial movement is effectively precluded. A cover for the extending and retracting portions of the assembly 10 is also provided in the form of multi-stage telescopic arm covers 24.

Other components of assembly 10 that can be seen in FIG. 1 and which will be described below include proximal torsional springs 26, 26, cir-clips 27, 27, distal torsional springs 28, 28 and retaining rings 30, 30. A fixed arm covering 72 and mirror back cover 74 are also shown. Also shown in FIG. 1 but not numbered nor described below with any specificity are covers for the mirror base 12 and mirror head assembly. Such coverings are generally standard in the art and their purpose and functionality well understood by persons skilled in the art. Similarly, the internal components of the mirror head assembly 20 (i.e. except for the bracket 18) are in accordance with conventional mirror heads and will not be described in any further detail below.

Figure 2A:
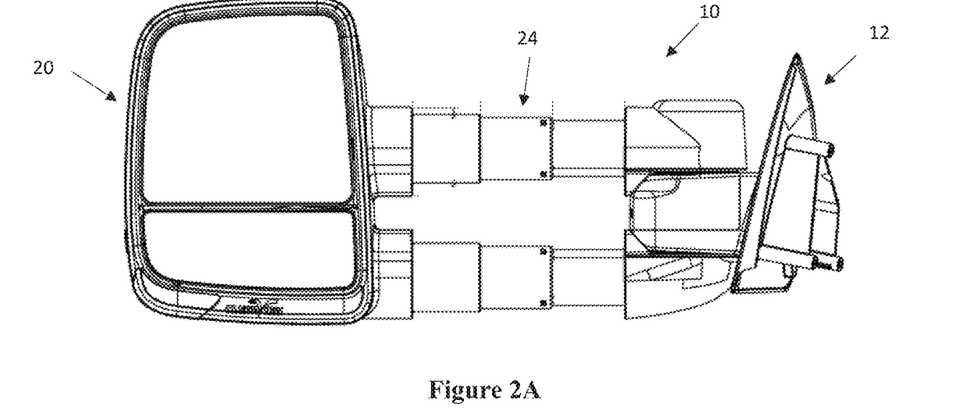
FIG. 2A shows a front elevational view of the extendable rear view mirror of FIG. 1, with a mirror base.
Figure 2B:
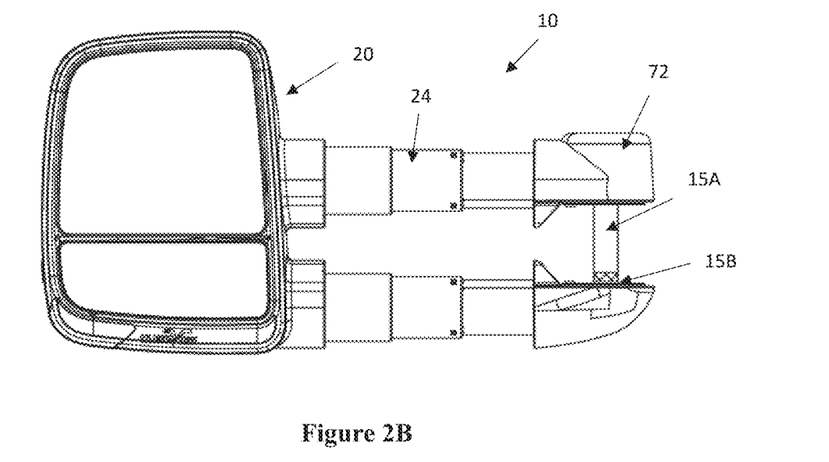
FIGS. 2B and 2C show front elevational view of the assembly of FIG. 2A, without a mirror base, in its fully extended and retracted configurations, respectively.
Figure 2C:
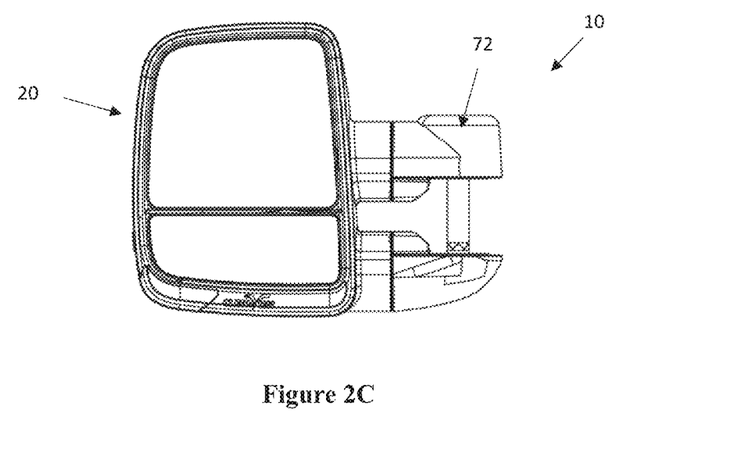

Referring now to FIGS. 2A, 2B and 2C, shown is the assembly 10 in a non-exploded form. FIGS. 2A and 2B show the assembly 10 in a fully extended configuration, where the mirror 20 is extended 180 mm further away from the vehicle (not shown) than is the case when the assembly is in its fully retracted position, as can be seen in FIG. 2C. Partially retracted configurations, where one or two of the telescopic arm covers 24 are retracted, result in the mirror 20 being extended about 120 mm and 60 mm from the vehicle, respectively. FIGS. 2A and 2B differ in that the mirror base 12, which is vehicle specific (and sometimes vehicle model specific) is not present in FIG. 2B. In FIG. 2B, the sleeves 15A, 15B of the respective arms 14A, 14B can instead be seen.

Figure 3A:
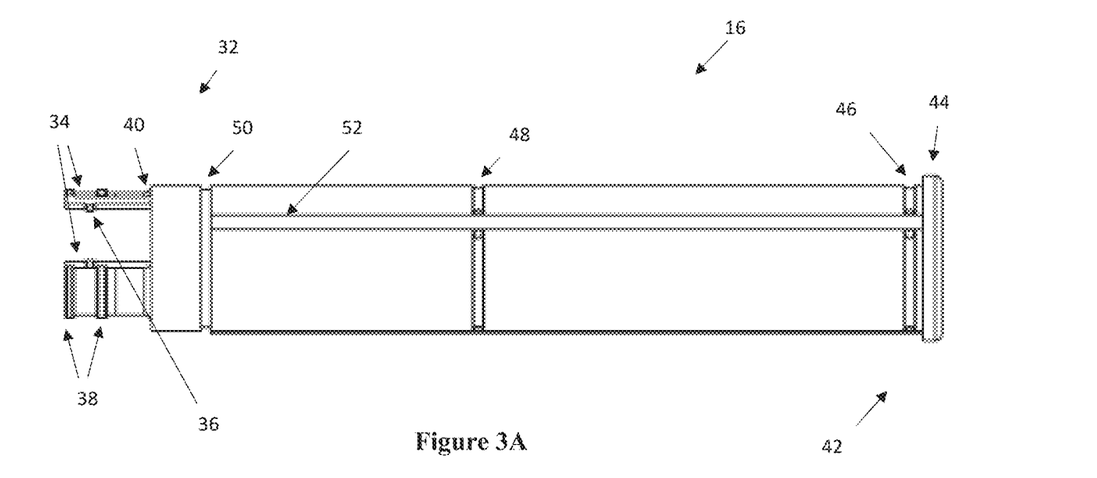
FIG. 3A shows a side view of an intermediate member of an assembly for attaching a rear view mirror to a vehicle in accordance with an embodiment of the present invention.
Figure 3B:
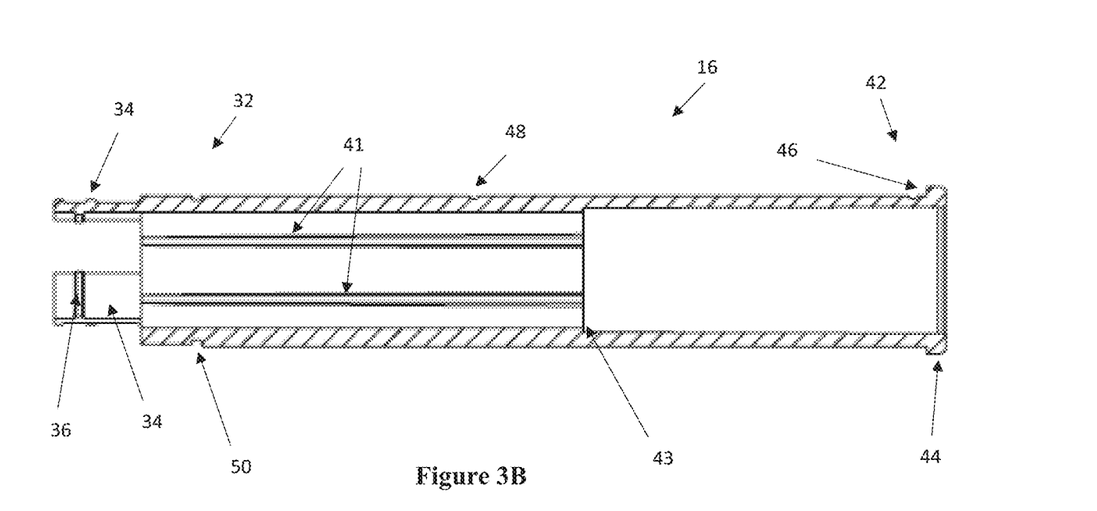
FIG. 3B shows a cross sectional view of the intermediate member of FIG. 3A.

Referring now to FIGS. 3A and 3B, the second stage tube 16 is shown. Tube 16 is made from polyacrylamide (PA), which is strong but also imparts a degree of resilience to the tube. The proximal (i.e. closest to the vehicle, in use) end 32 of tube 16 includes three crenulations 34, arranged in an equally spaced configuration (only two of which can be seen). An inner surface of each crenulation 34 includes a projection that provides a snap fitting 36 for engaging with the arm 14 in the manner described below. An outer surface of each crenulation 34 includes annular flanges 38, 38 and a shoulder 40, where the crenulations start. The purpose of the recesses defined between annular flanges 38, 38 and shoulder 40 will be described in further detail below. As would be appreciated, the crenulations 34 enable the proximal end 32 of the tube 16 to have a degree of movement that would otherwise not be possible.

As can be seen in FIG. 3B, an interior of the proximal end 32 of the tube 16 includes a number of longitudinal ribs 41 arranged in an equally spaced configuration around the tube's bore. These ribs 41 are configured to abut and slidably engage with the arm 14, when it is located inside the tube 16. In this manner, non-axial movement of the tube 16 on the arm 14 is precluded but also, as the surface contact area between the arm 14 and tube 16 is significantly reduced, then the chance of mechanical issues arising due to the parts sticking because of contaminants (e.g. dust, moisture, road grit, etc.) in the assembly is substantially reduced. In the embodiment shown, the ribs 41 extend for the entire length of the engagement between the arm 14 and tube 16, when the mirror 20 is in its extended configurations (see below).

The bore of tube 16 also includes an annular shoulder 43, which acts to limit the movement of arm 14 with respect to tube 16 in the manner described below.

The distal end 42 of the second stage tube 16 includes an annular flange 44 in order to increase the strength of the tube when the mirror head 20 is at the end of its travel. Positional grooves 46 and 48 are also provided in the form of annular recesses on the outside surface of the tube 16. The purpose of these grooves will be described in further detail below. Groove 50 receives the cir-clip 27, which acts to limit the movement of the tube 16 with respect to the support bracket 18, as described below. Finally, the outside surface of the tube 16 also includes longitudinally arranged ribs 52, which act to strengthen the tube 16 and also control rotation of the tube with respect to the mirror head assembly in the manner described below. In the embodiments shown, tube 16 incudes three such ribs 52 equally spaced around the tube, although only one can be seen.

Figure 4A:
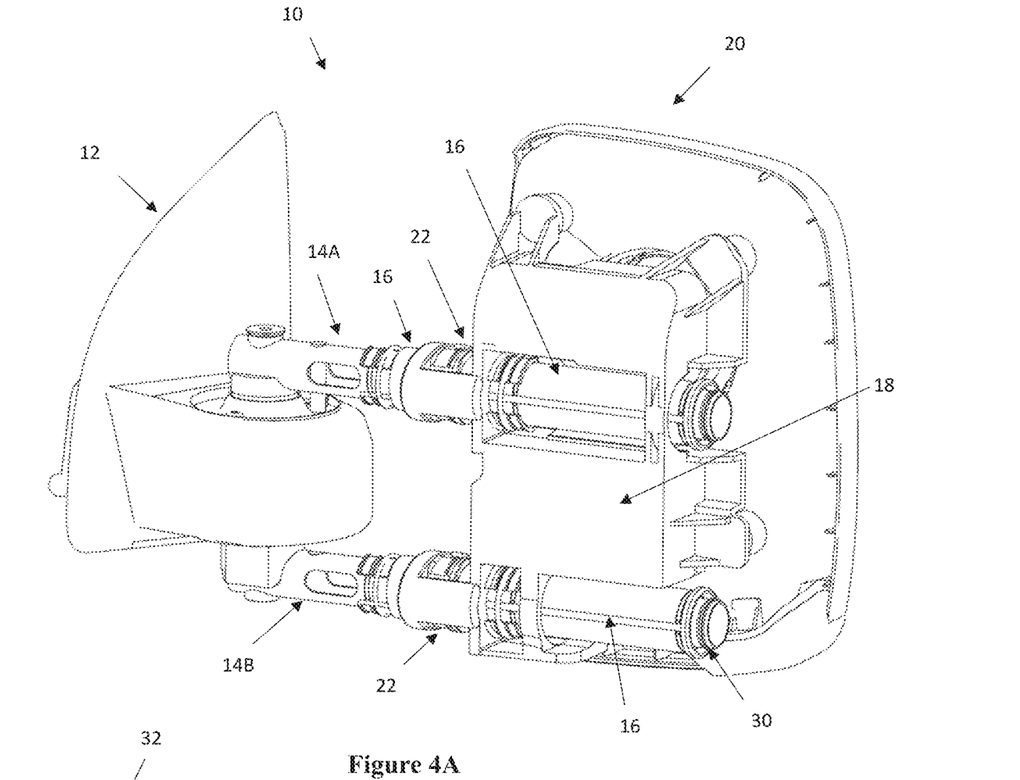
FIG. 4A shows a rear perspective cutaway view of an extendable rear view mirror assembly in accordance with an embodiment of the present invention, where the assembly is in a retracted configuration.
Figure 4B:
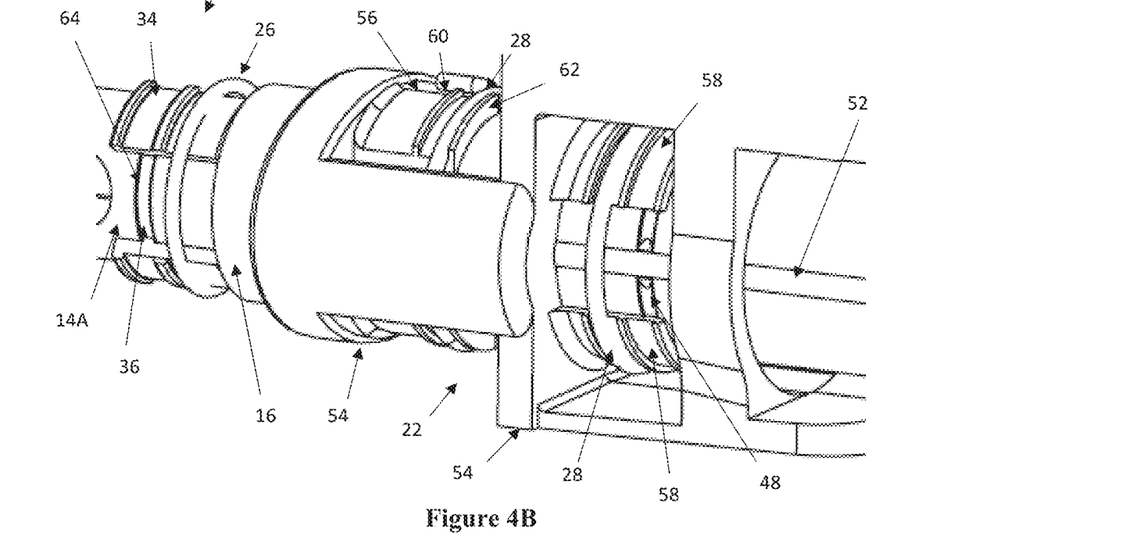
FIG. 4B shows a detailed view of the intermediate member and mirror head support of the assembly of FIG. 4A.
Figure 4C:
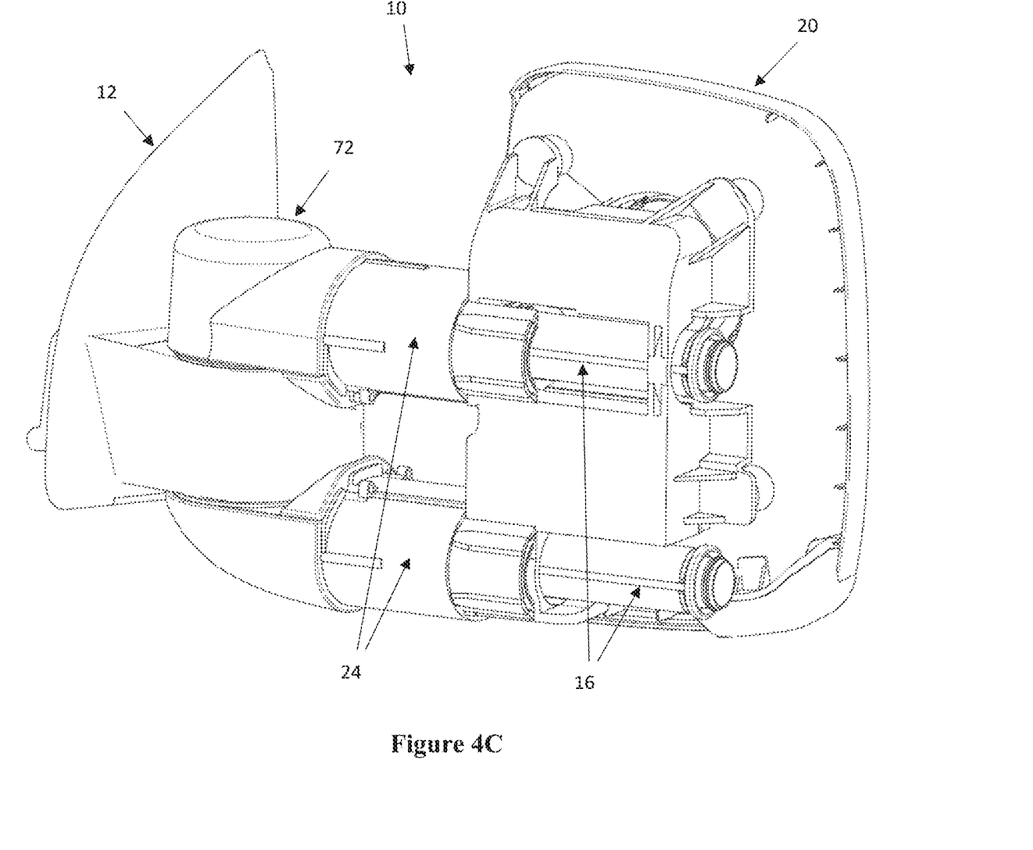
FIG. 4C shows a rear perspective cutaway view of the assembly of FIG. 4A, where a collapsible cover extending between the mirror base and mirror head is shown.
Figure 5A:
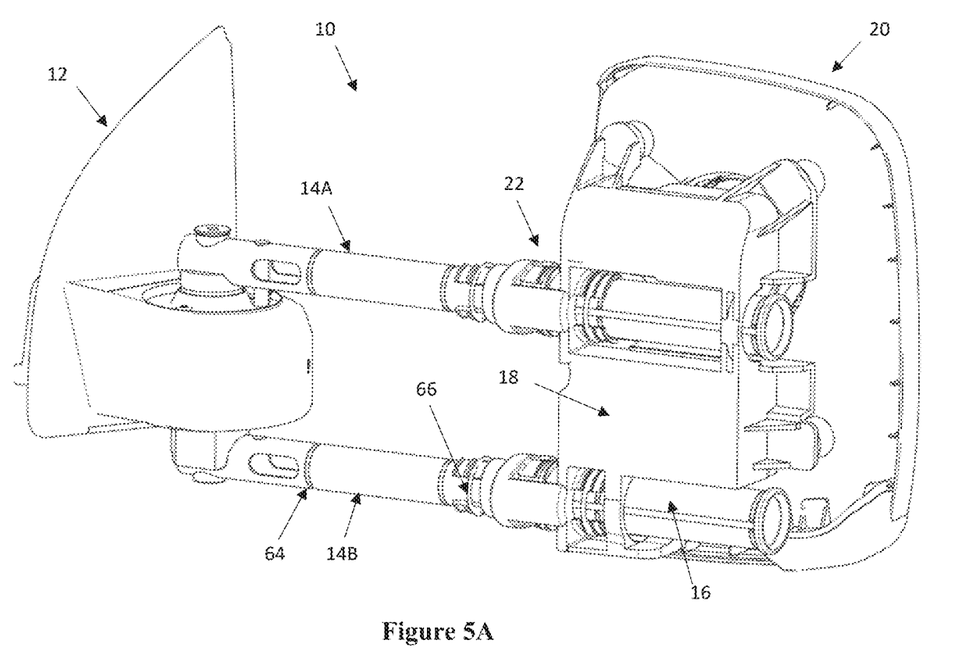
FIG. 5A shows a rear perspective cutaway view of the assembly of FIG. 4A, where the assembly is in a partially extended configuration.
Figure 5B:
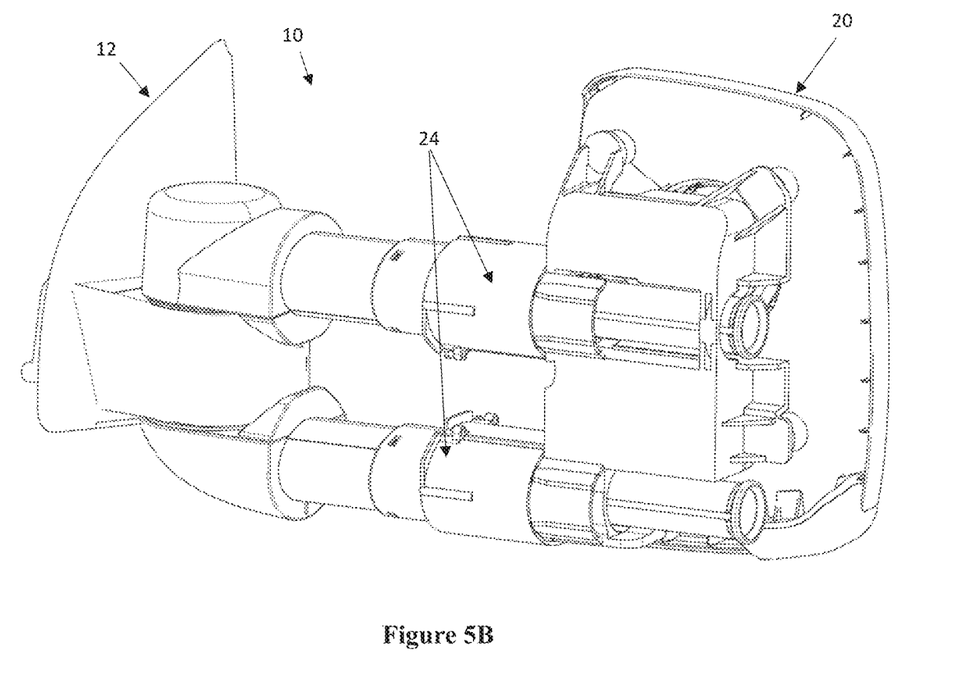
FIG. 5B shows a rear perspective cutaway view of the assembly of FIG. 5A, with the cover being shown.
Figure 6A:
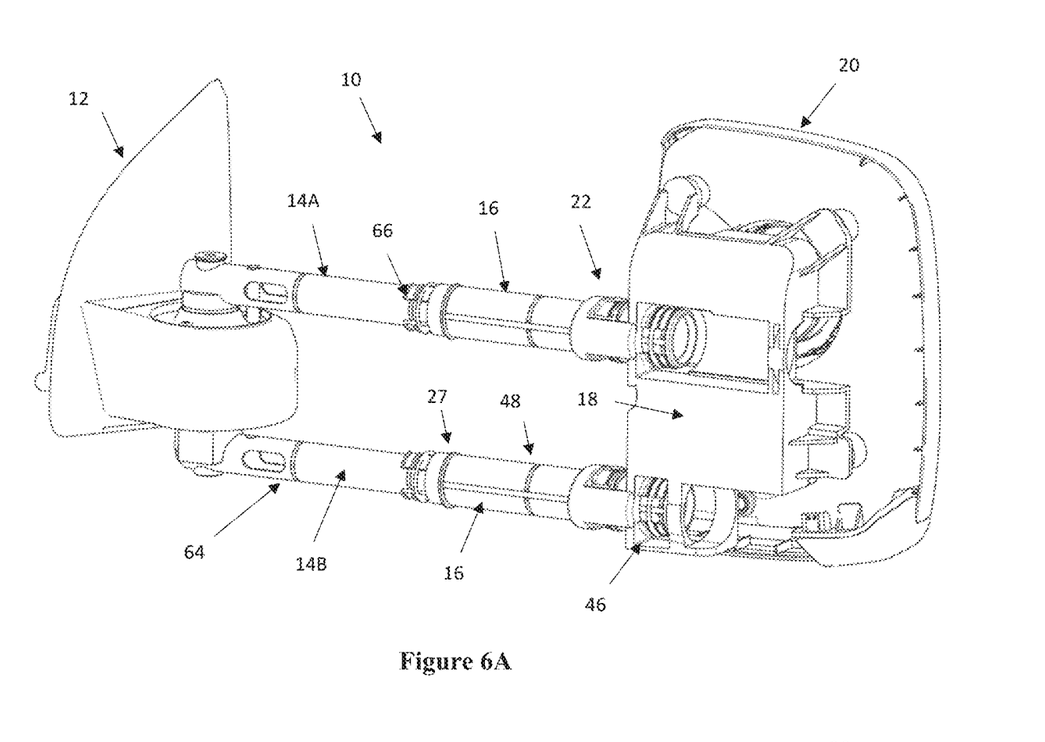
FIG. 6A shows a rear perspective cutaway view of the assembly of FIG. 4A, where the assembly is in a fully extended configuration.
Figure 6B:
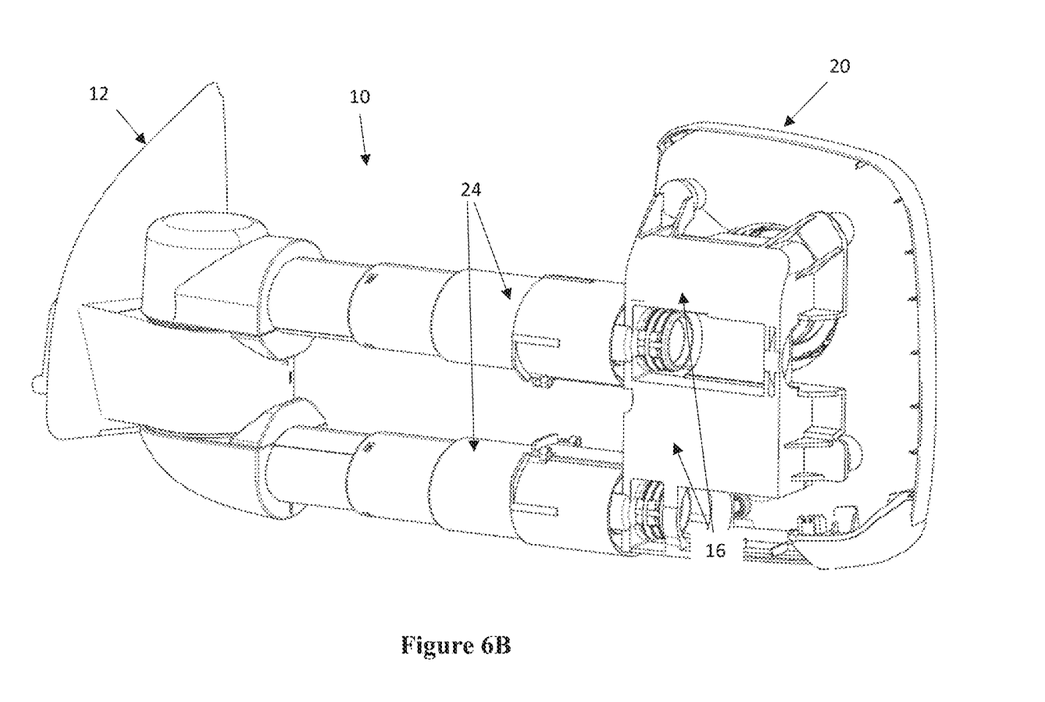
FIG. 6B shows a rear perspective cutaway view of the assembly of FIG. 6A, with the cover being shown.

Referring now to FIGS. 4, 5 and 6, the mirror assembly 10 is shown in its retracted, partially extended and fully extended configurations, respectively. FIGS. 4A and 4C (and FIGS. 5A/5B and 6A/6B) differ only in that FIG. 4C (as well as 5B and 6B) also shows the telescopic covers 24 and the covers over the mirror base 12.

As can be seen in FIGS. 4A and 4B, the second stage tubes 16, 16 are located within the support bracket 18 of the mirror head assembly 20. Each of the bosses 22, 22 receive a respective tube 16 therein, with the tubes being slidable with respect to the bosses as shown in FIGS. 4A and 6A in order to extend the mirror head 20 away from the base. As can be seen, each boss 22 includes two spaced apart circular apertures 54, 54, through which the tube 16 passes, and which provide a snug attachment at two separate portions of the tube. Adjacent to each aperture 54 on the boss 22 are three equally spaced crenulations 56 and 58 that are configured to engage with the outer surface of the tube 16 to provide an extended overlap and hence greater stability. Similar to the proximal end 32 of the second stage tube 16 described above, snap hooks (not shown) are provided on inner surfaces of crenulations 56, 58, which can engage with grooves 46, 48. In the embodiment shown in FIG. 4, the snap hooks of crenulations 58 are securely located in groove 48. An outer surface of each crenulation 56, 58 includes annular flanges 60 and 62, between which a torsional spring 28 may be located in order to firmly clamp the crenulations (and their attendant snap hooks) onto the tube 16. As noted previously, the crenulations 56, 58 enable the boss 22 and snap hooks to have a degree of movement that would otherwise not be possible for a tubular structure.

Each support bracket 18 also includes a space within the mirror head assembly 20 to receive the second stage tubes 16, 16 (see FIGS. 4 and 5), as well as the arms 14, 14 (see FIG. 4) in the fully retracted configuration. This space may also be configured to include a driver or drivers (not shown) for adjusting the orientation of the mirrors (not shown) and/or for retracting and extending the mirror head 20 towards/away from the vehicle.

As can be seen in FIG. 4A, retaining ring 30 is located in an annular groove at the distal end of arms 14A, 14B. This ring 30 has a dimension that enables it to slide within the tube, but only as far a shoulder 43 (see FIG. 3B). In this manner, the arms 14 can only be slid about half way along tube 16, and between the configurations shown in FIGS. 4 and 5. Cir-clip 27 (see FIG. 6A) is located in annular groove 50 of tube 16 and, although it cannot be seen in FIG. 4A, abuts boss 22 and prevents mirror head 20 from moving any further towards mirror base 12 in use.

As can best be seen in FIG. 4B, the snap locks 36 on crenulations 34 at the proximal end 32 of the tube 16 are located in an inner position control groove 64 on the arm 14 (see also FIGS. 5A and 6A). The interaction between the three snap locks 36 equispaced around the periphery of the proximal end 32 of the tube 16 and the groove 64 on the arm 14 causes the two parts to be rigidly joined together, with no relative movement therebetween being possible without the application of a high degree of force. Furthermore, the location of torsional spring 26 in the recess between annular flange 38 and shoulder 40 (and/or between annular flanges 38, 38, not shown) acts to clamp the proximal end 32 onto the arm 14, urging the snap locks 36 into an even more rigidly held position in the groove 64. This rigid connection between the proximal end of the tube 16 and the arm 14, combined with the snug fit between the outer surface of the arm 14 and inner surface of the tube 16 (with the same interaction between the other arm 14 and tube 16) effectively results in a join where relative movement cannot occur. In effect, the parts are rigidly joined as if they were a single part.

Referring now to FIGS. 5A and 5B, the mirror head 20 is shown in a partially extended position. In this first stage extension, the second stage tubes 16, 16 and mirror head support bracket 18 have been caused to move with respect to the arms 14, 14 until the snap locks 36 at the proximal end 32 of each tube are located in an outer position control groove 66 on the arm 14. Although it cannot be seen, the retaining ring 30 on each arm 14 abuts the shoulder 43 inside of the tube 16. The nature of this interaction is similar to that described above, albeit with a shorter length of the arms 14, 14 being located within the tubes 16, 16. However, the combination of the rigid connection between the three snap locks 36 and outer position control grooves 66 of both spaced apart arms 14, 14 provide a join between the arms and remainder of the mirror assembly 10 that is effective to substantially prevent vibration of the mirror head 20.

Referring now to FIGS. 6A and 6B, the mirror head 20 is shown in a fully extended position. In this second stage extension, the arms 14, 14 are in the same relationship with the second stage tubes 16, 16 as was described above for the first stage extension. However, the mirror head support bracket 18 has been caused to move with respect to the tubes 16, 16 until the snap locks associated with crenulations 58 of the bosses 22 are located in the positional groove 46 on the distal end 42 of the second stage tube 16. Similar physical interactions to those described above result in the join between the tubes 16, 16 and bracket 18 being rigid. Again, in effect, despite there being multiple components in the assembly which can move with respect to each other, this movement is limited to being strictly axial movement. Non-axial movement between the parts and attendant vibration) is substantially precluded and these parts are also rigidly joined as if they were a single part.

In use, the movement between the retracted, partially extended and fully extended positions may be automatically actuated, for example using one or more linear drivers. Alternatively, pulling or pushing the mirror head 20 in a direction in alignment with the longitudinal axis of the arms 14 and tubes 16 with sufficient force may enable the mirror head to be manually moved between these positions. As would be appreciated, the snap locks on crenulations 34 and 58 would provide an audible click when in position in the respective grooves 64, 66 and 46, 48. A driver may similarly be provided in the mirror base 12 to rotate the arms 16 such that the mirror head 20 folds inwardly towards the side of the vehicle and into a stowed position and outwardly into a driving position.

Figure 7:
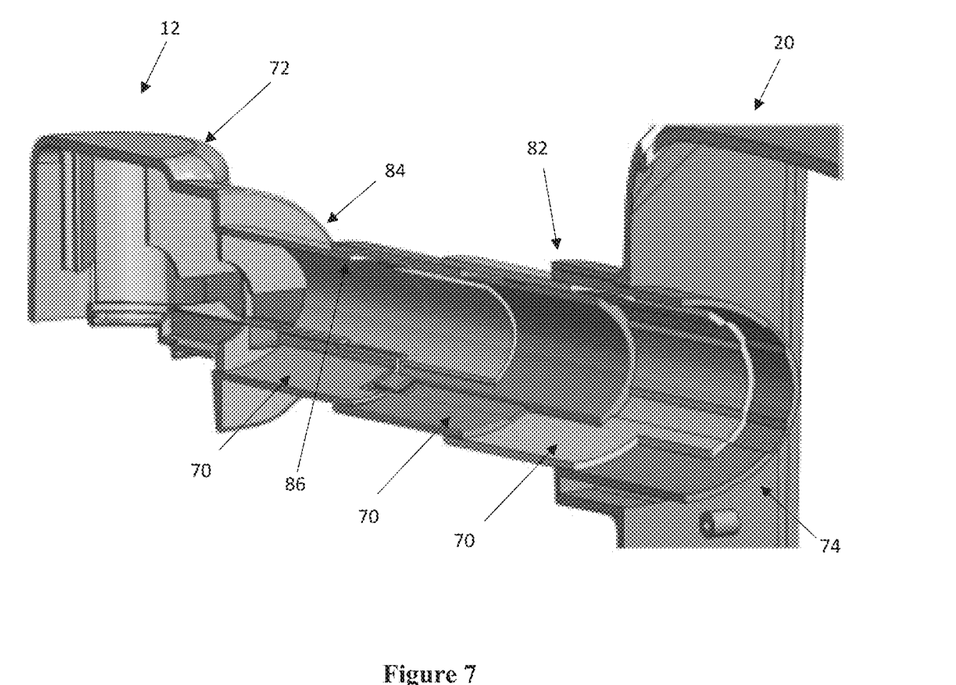
FIG. 7 shows a perspective cutaway view of the collapsible cover of an extendable rear view mirror assembly in accordance with an embodiment of the present invention.
Figure 8:
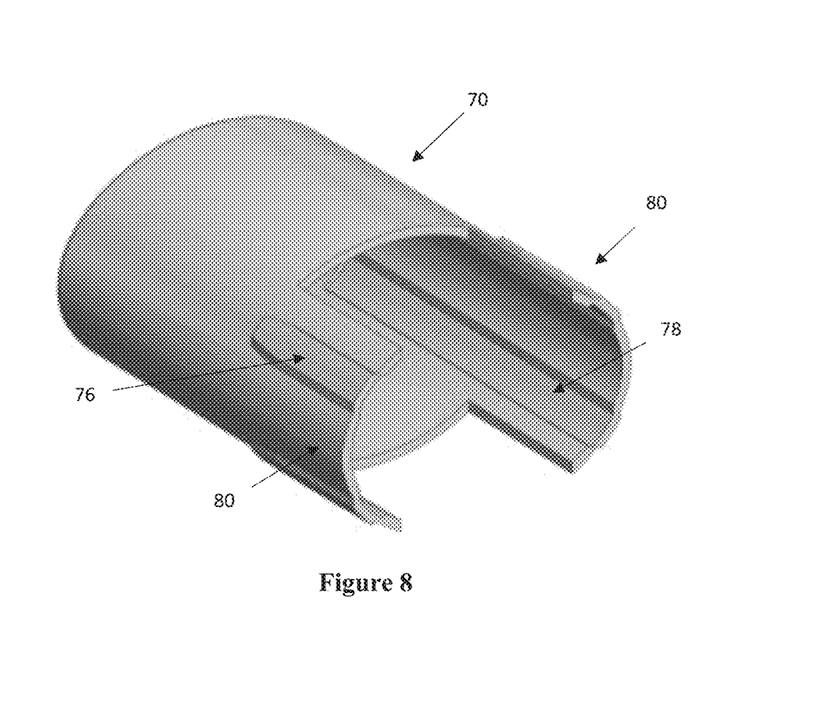
FIG. 8 shows one of the sleeves of the collapsible cover of FIG. 7.

Referring finally to FIGS. 7 and 8, the multistage telescopic arm covers 24 are shown in greater detail. Referring firstly to FIG. 7, the assembly is shown in an extended configuration with three sleeves 70 telescopically arranged between mirror base cover 72 (see also FIG. 1) and mirror back cover 74 (see also FIG. 1). A representative sleeve 70 is shown in FIG. 8, and includes external ribs 76 that are configured to interrelate with internal slots 78 of an adjacent sleeve in order to cause the telescopic extension and contraction of the sleeves 70, 70, 70 in each cover 24. The ribs 76 and slots 78 also ensure that radial movement between adjacent sleeves 70 is minimised, providing the cover 24 with form and stability. Extension wings 80, 80 of the sleeve 70 also help to increase stability and facilitate nesting of the sleeves within the mirror head assembly 20 when in the collapsed (i.e. mirror retracted) configuration.

In the collapsed configuration, the sleeves 70 nest inside one another and inside of the mirror head assembly 20. A leading edge 82 of mirror back cover 74 abuts surface 84 of the mirror base cover 72 when in this configuration, providing an aesthetic appeal to the assembly, as well as hindering the ingress of dirt, moisture, etc, through the cover 24. Snap hooks 86 (only one is shown in FIG. 7) are provided on the sheath which extends from the mirror base cover 72 and which can engage with slots in the adjacent sleeve 70 and which, when disengaged, provide access to the interior workings of the assembly 10.

It will be appreciated that the present invention provides a number of new and useful advantages. For example, specific embodiments of the present invention may provide one or more of the following advantages:

- a rear view towing mirror can be rigidly held with a minimum amount of vibration or other play between the supporting arm members, reducing vibration of the rear view mirror (especially for towing rear view mirrors) in use, which can help to improve the mirror's effectiveness and lifespan;
- an extension range not previously realised for rear view mirrors of 180 mm is obtainable using the novel assembly of the present invention, without excessive vibration of the mirror;
- the assembly is configured to operate in a manner where the mirror head can be moved both inwardly and outwardly from its normal in use position, enabling the mirror to be positioned both further away from and closer to the vehicle than is possible for many conventional mirrors; and
- the assembly is configured for use with any mirror base and hence for mounting on any vehicle, including new vehicles.

It will be understood to persons skilled in the art of the invention that many modifications may be made without departing from the spirit and scope of the invention. All such modifications are intended to fall within the scope of the following claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that any prior art publication referred to herein does not constitute an admission that the publication forms part of the common general knowledge in the art.

The invention claimed is:

1. An extendable rear view mirror assembly comprising:
   - a mirror base configured for attachment to a side of a vehicle;
   - one or more arms that extend outwardly from the mirror base;
   - one or more intermediate members, each of which is configured to slide with respect to a respective arm, a proximal end of the or each intermediate member being configured to interlock with the arm whereby the arm and intermediate member become rigidly joined;
   - a mirror head comprising a mirror head support that is configured to slidably receive the one or more intermediate members, the mirror head support being configured to interlock with the or each intermediate member, whereby the mirror head support and the one or more intermediate members become rigidly joined,
   - wherein the proximal end of each of the one or more intermediate members comprises snap hooks configured to interlock with lateral grooves spaced along the respective arm.

2. The assembly of claim 1, wherein the one or more arms, the one or more intermediate members and mirror head support define concentric tubular parts that slide telescopically with respect to each other.

3. The assembly of claim 2, wherein the mirror head support comprises one or more tubular recesses into which the one or more intermediate members are slidably receivable.

4. The assembly of claim 2, wherein each of the one more intermediate members comprises longitudinal ribs that extend along at least a portion of its bore, whereby a surface contact area between an outside of the one or more arms and an inside of the one or more intermediate members is reduced.

5. The assembly of claim 2, wherein each of the one or more intermediate members comprises one or more longitudinal ribs that extend along an outer surface thereof, the longitudinal ribs being locatable in a corresponding one or more grooves in the mirror head support whereby rotation of the one or more intermediate members with respect to the mirror head support is precluded.

6. The assembly of claim 1, wherein the positions of the lateral grooves corresponded to defined positions of the mirror head.

7. The assembly of claim 1, wherein the snap hooks are provided on crenulations projecting from the proximal end of each of the one or more intermediate members.

8. The assembly of claim 1, further comprising one or more torsional springs configured to clamp the proximal end of each of the one or more intermediate members onto the respective arm.

9. The assembly of claim 1, wherein an outer surface of each of the one or more intermediate members comprises lateral grooves spaced therealong.

10. The assembly of claim 9, wherein the mirror head support comprises snap hooks configured to interlock with the lateral grooves on the outer surface of each of the one or more intermediate members.

11. The assembly of claim 10, wherein the snap hooks are provided on crenulations projecting from the mirror head support.

12. The assembly of claim 9, wherein the position of the lateral grooves on the outer surface of the intermediate member correspond to defined positions of the mirror head.

13. The assembly of claim 1, further comprising one or more torsional springs configured to clamp the mirror head support onto each of the one or more intermediate members.

14. The assembly of claim 1, wherein the one or more intermediate members comprises two intermediate members configured to slide with respect to and interlock with two arms that extend outwardly from the mirror base, and
wherein the mirror head support is configured to slidably receive and interlock with the two intermediate members.

15. The assembly of claim 14, wherein the arms are parallel and are joined at a proximal end by a cross member that is rotatably mounted to the mirror base and whereby rotation of the cross member causes the mirror head to move between an infolded position and a deployed position.

16. The assembly of claim 15, comprising a driver that is operable to move the mirror head between the infolded and deployed positions.

17. The assembly of claim 1, further comprising a collapsible cover extending between the mirror base and the mirror head, whereby the one or more arms and one or more intermediate members are covered.

18. The assembly of claim 17, wherein the collapsible cover comprises a plurality of overlapping sleeves that are configured to telescopically collapse and expand.

19. An assembly for attaching a rear view mirror to a vehicle, the assembly comprising:
an intermediate member configured to slide with respect to an arm that extends outwardly from a mirror base, a proximal end of the intermediate member comprising snap hooks configured to interlock with lateral grooves spaced along the arm whereby the arm and intermediate member become rigidly joined; and
a mirror head support configured to slide with respect to the intermediate member, the mirror head support being configured to interlock with the intermediate member whereby the mirror head support and intermediate member become rigidly joined.

\* \* \* \* \*